(12) United States Patent
Kawamura et al.

(10) Patent No.: US 10,968,605 B2
(45) Date of Patent: Apr. 6, 2021

(54) SWIVEL JOINT FOR WORKING MACHINE

(71) Applicant: Caterpillar SARL, Geneva (CH)

(72) Inventors: Taro Kawamura, Hyogo (JP); Takashi Sasajima, Hyogo (JP)

(73) Assignee: Caterpillar SARL, Geneva (CH)

( * ) Notice: Subject to any disclaimer, the term of this patent is extended or adjusted under 35 U.S.C. 154(b) by 464 days.

(21) Appl. No.: 15/762,212

(22) PCT Filed: Oct. 17, 2016

(86) PCT No.: PCT/EP2016/074865
§ 371 (c)(1),
(2) Date: Mar. 22, 2018

(87) PCT Pub. No.: WO2017/071982
PCT Pub. Date: May 4, 2017

(65) Prior Publication Data
US 2018/0282975 A1    Oct. 4, 2018

(30) Foreign Application Priority Data

Oct. 28, 2015  (JP) .............................. JP2015-212241

(51) Int. Cl.
*F16L 27/08*    (2006.01)
*E02F 9/22*     (2006.01)
*E02F 9/00*     (2006.01)

(52) U.S. Cl.
CPC ............ *E02F 9/2275* (2013.01); *E02F 9/006* (2013.01); *F16L 27/0804* (2013.01)

(58) Field of Classification Search
CPC ............... F16L 27/0804; F16L 27/0808; F16L 27/0812; F16L 27/0816; E02F 9/26; E02F 9/006; E02F 9/2275

(Continued)

(56) References Cited

U.S. PATENT DOCUMENTS

| | | | | |
|---|---|---|---|---|
| 5,528,140 A | * | 6/1996 | Fuki ....................... | F02P 7/0675 |
| | | | | 123/612 |
| 2005/0046181 A1 | * | 3/2005 | Falconer ............... | F16L 27/087 |
| | | | | 285/121.6 |

(Continued)

FOREIGN PATENT DOCUMENTS

| JP | S 627458 U | 1/1987 |
|---|---|---|
| JP | H 0212658 U | 1/1990 |

(Continued)

OTHER PUBLICATIONS

International Search Report for related International Application No. PCT/EP2016/074865; report dated Feb. 1, 2017.

*Primary Examiner* — Aaron M Dunwoody

(57) ABSTRACT

An embodiment of this invention provides a swivel joint for a working machine that makes it easy to install a device for detecting rotation angle and is able to suppress the increase of the size due to the installation of the device. An embodiment of the present invention includes the swivel joint that includes an outer body being secured on one of the lower traveling body and the upper swiveling body and having a blocking surface on one end; an inner body being secured on another of the lower traveling body and the upper swiveling body and being relatively and rotatably fitted in the outer body while opposing to the blocking surface at one end n in the manner of making a space; a pilot oil passage being formed on rotational center line CL of the inner body for distributing pilot oil; a rod being inserted into the pilot oil passage and being secured on one of the outer body and the inner body; and a rotation angle sensor being secured on the other end of the outer body and the inner body for detecting a rotation angle of the rod.

6 Claims, 5 Drawing Sheets

(58) Field of Classification Search
USPC ............... 285/93, 121.3, 122.1, 121.1, 144.1
See application file for complete search history.

(56) References Cited

U.S. PATENT DOCUMENTS

| | | | | |
|---|---|---|---|---|
| 2007/0266601 | A1* | 11/2007 | Claxton | G01G 3/141 37/396 |
| 2010/0226710 | A1* | 9/2010 | Yamasaki | E02F 3/301 403/81 |
| 2010/0265806 | A1* | 10/2010 | Matsushima | G01D 1/00 369/53.41 |
| 2013/0177377 | A1* | 7/2013 | Van Hooft | E02F 3/3654 414/723 |
| 2014/0145429 | A1* | 5/2014 | Chung | F16L 27/02 285/144.1 |
| 2015/0155759 | A1* | 6/2015 | Matsuo | B62D 5/0406 310/52 |
| 2017/0045171 | A1* | 2/2017 | Chioccola | F16L 29/00 |
| 2017/0096193 | A1* | 4/2017 | Eide | F16L 17/10 |
| 2017/0306587 | A1* | 10/2017 | Hosaka | E02F 9/264 |
| 2018/0038064 | A1* | 2/2018 | Jung | F16H 1/16 |
| 2018/0170737 | A1* | 6/2018 | Andersen | B65B 3/00 |
| 2019/0178114 | A1* | 6/2019 | Iwaya | F01L 1/3442 |
| 2020/0153368 | A1* | 5/2020 | Kobayashi | H02K 7/003 |

FOREIGN PATENT DOCUMENTS

| | | | |
|---|---|---|---|
| JP | 2001073414 A | 3/2001 | |
| JP | 2013023865 A | 2/2013 | |

* cited by examiner

SWIVEL JOINT FOR WORKING MACHINE

CROSS-REFERENCE TO RELATED APPLICATION

This Application is a 35 USC § 371 US National Stage filing of International Application No. PCT/EP2016/074865 filed on Oct. 17, 2016 which claims priority under the Paris Convention to Japanese Serial No. 2015-212241 filed on Oct. 28, 2015.

FIELD OF THE INVENTION

The present invention relates to a swivel joint for a working machine, the swivel joint for the working machine for distributing pressure oil between a lower traveling body and an upper swiveling body being swivelably installed on the lower traveling body and having a function to detect a swivel angle of the upper swiveling body.

BACKGROUND ART

A working machine such as a hydraulic excavator includes articulated arm mechanism including a boom, a stick, a work attachment (bucket, for example), and others, and hydraulic cylinders are installed between two components of the boom, the stick, and the work attachment.

An operation of hydraulic cylinders is controlled by controllers. Each controller is configured to receive an input of detection information from various types of sensors and each controller makes each arm mechanism perform a desired action by appropriately controlling extension and contraction of each hydraulic cylinder based on the various types of detection information in an automatic or semiautomatic operation.

In the automatic or semiautomatic operation, since a relative angle between the upper swiveling body and the lower swiveling body is required, the swivel angle of the upper swiveling body is detected by a sensor and input into the controller. In general, the sensor for detecting a swivel angle is installed on a swivel joint, which supplies and receives hydraulic oil between the lower traveling body and the upper swiveling body. In particular, the swivel angle of the upper swiveling body is detected by detecting a relative rotation amount between a component installed on the upper swiveling body and a component installed on the lower traveling body among the components composing the swivel joint.

In patent document 1, a swivel angle measurement instrument is described that, in the swivel joint including a rotor having a center hole and being mounted on the lower traveling body and a shaft being rotatably contained in the rotor and being mounted on the upper swiveling body, is configured to detect the swivel angle of the upper swiveling body by detecting a rotation displacement of a rolling roller, which is depressed against a detection surface provided on the outer peripheral surface of the rotor and rotates according to a relative rotation angle between the rotor and the shaft, by using a rotation detector mounted on a side of the rotor and a side of the shaft.

In patent document 2, another swivel angle measurement instrument is described that, in a rotary joint (swivel joint) including a fixing shaft installed on a lower vehicle side and a housing being rotatably borne around the fixing shaft and being secured on the upper swiveling body, is configured to detect the swivel angle of the upper swiveling body by detecting a relative rotation amount between an end plate and a shaft rod coupled to a top center (that is, the center of the swivel joint) using a rotation detector installed on the end plate blocking a top surface of the housing.

CITATION LIST

Patent Documents

PTL 1: Japanese Unexamined Patent Application Publication No. 2013-023865
PTL 2: Microfilm of Japanese Utility Model Application Sho 60-97486 (Japanese Unexamined Utility Model Application Publication Sho 62-07458)

SUMMARY OF INVENTION

Technical Problem

The swivel angle measurement instrument described in PTL 1 requires a space for installing the rotation detector on the side of a main body of a swivel joint composing of a rotor and a shaft.

Also, the constitution for detecting the swivel angle, such as that the detection surface is provided on the outer peripheral surface of the rotor and that the rolling roller is depressed against the detection surface, is complicated and it takes time and effort to install the swivel angle measurement instrument. In addition, since a structure of the swivel joint equipped with the swivel angle measurement instrument is significantly different from a structure of the swivel joint without the same, it is difficult to install the swivel angle measurement instrument afterward on the swivel joint not designed to install the instrument.

The swivel angle measurement instrument described in PTL 2, in order to couple the shaft rod to a top of the fixing shaft, also requires a space for arranging the rotation detector including the shaft rod on an upper side of a body of the swivel joint which includes the fixing shaft and the housing, so the size of the swivel joint is increased.

This invention is designed in consideration of the challenge above and is intended to provide a swivel joint for a working machine that makes it easy to install a device for detecting a rotation angle and is able to suppress the increase of the size due to the installation of the device.

Solution to Problem (1) In order to attain the purpose above, a swivel joint for a working machine according to the invention is a swivel joint for a working machine for distributing hydraulic oil between a lower traveling body and an upper swiveling body that is swivelably installed on the lower traveling body, wherein the swivel joint includes an outer body being secured on one of the lower traveling body and the upper swiveling body and having a blocking surface on one end; an inner body being secured on another of the lower traveling body and the upper swiveling body and being relatively and rotatably fitted in the outer body while opposing to the blocking surface in a spaced manner at one end; a pilot oil passage being formed on rotational center line of the inner body for distributing pilot oil; a rod being inserted into the pilot oil passage and being secured on one of the outer body and the inner body; and a rotation angle sensor being secured on another of the outer body and the inner body for detecting a rotation angle of the rod.

(2) It is preferable that the pilot oil passage is open at the one end of the inner body, and the rod is secured on the blocking surface of the outer body at one end and is arranged within the pilot oil passage at the other end so as to be inserted from the one end of the inner body; and it is preferable that the rotation angle sensor is installed on the inner body while opposing to the other end of the rod.

(3) It is preferable that the rotation angle sensor is a noncontact sensor arranged at an interval at the other end of the rod.

(4) It is preferable that the pilot oil passage is provided penetrating from the one end to the other end and the rotation angle sensor is installed on the other end of the inner body so as to be inserted into the pilot oil passage.

(5) It is preferable that the lower traveling body includes a plurality of first annular high-pressure oil passages, which are equipped with a running motor that works with high-pressure oil higher than the pilot oil, which are formed between inner peripheral surface of the outer body and outer peripheral surface of the inner body, and in which the high-pressure oil to be supplied to the running motor flows; a first annular drain oil passage, which is formed between the inner peripheral surface of the outer body and the outer peripheral surface of the inner body, and in which an oil leaked from the running motor flows; an annular oil recovery passage, which is formed between the inner peripheral surface of the outer body and the outer peripheral surface of the inner body, and which is configured to recover high-pressure oil leaked from the first high-pressure oil passages; a plurality of second high-pressure oil passages, which are formed in the inner body, and which are communicated respectively with a plurality of the first high-pressure oil passages; and a second drain oil passage, which is formed in the inner body, and which is communicated with the first drain oil passage and the oil recovery passage; and it is preferable that the first drain oil passage and the oil recovery passage are arranged so as to hold a plurality of the first high-pressure oil passages from outside in the axial direction of the outer body and the inner body.

(6) It is preferable that, between the inner peripheral surface of the outer body and the outer peripheral surface of the inner body, a seal member is attached to both outside between two passages of a plurality of the first high-pressure oil passages, the first drain oil passage, and the oil recovery passage, and outside of the axial direction.

Advantageous Effects of Invention

According to the swivel joint for a working machine based on the invention, since the rod to detect an angle of the upper swiveling body is inserted into the pilot oil passage, it is easy to mount the sensor.

Moreover, an increase in the size of the swivel joint due to installation of an instrument for detecting a rotation angle can be suppressed. That is, it is important that the pilot oil passage is filled with pilot oil as a pressure transmitting medium so that a pilot pressure can be transmitted from an operation lever to an operation apparatus; when inserting the rod into the pilot oil passage, an impact given on an oil distribution is relatively small compared to when inserting the rod into other oil passage such as the drain oil passage; even when the rod is inserted, the size of the pilot oil passage is almost that same as when the rod is not inserted so that an increase in the size of the swivel joint due to an installation of the rotation angle sensor and the rod can be suppressed.

BRIEF DESCRIPTION OF THE DRAWINGS

FIG. 2 is a schematic diagram representing the constitution of a swivel joint for a working machine as the embodiment of the invention.

FIG. 3 is a schematic diagram representing the constitution of the swivel joint of a working machine as the embodiment of the invention in a state where a rotation angle sensor and a rod are removed.

FIG. 5 is a schematic diagram representing the constitution of a conventional swivel joint.

EMBODIMENT

Reference is now made to the drawings to illustrate an embodiment of the invention.

The embodiment described below is only an example; the embodiment below is not intended to exclude various modifications and applications of technologies not explicitly described in the embodiment below. Various modifications can be made to each constitution of the embodiment below without departing from the spirit; each component can be selected, as necessary, and can be combined appropriately.

The embodiment below shows an example where a swivel joint for a working machine according to the invention is applied to a hydraulic excavator as a working machine; the swivel joint for the working machine according to the invention can be applied to various general working machines such as hydraulic crane, in addition to hydraulic excavator.

In a following description, unless otherwise noted, it is assumed that a gravity direction is downward and a reverse direction is upward. Also in the description of the swivel joint, unless otherwise noted, upward and downward directions are defined based on a state in which the swivel joint is mounted on a working machine in a horizontal state.

[1. Constitution of Hydraulic Excavator]

Figure 1:
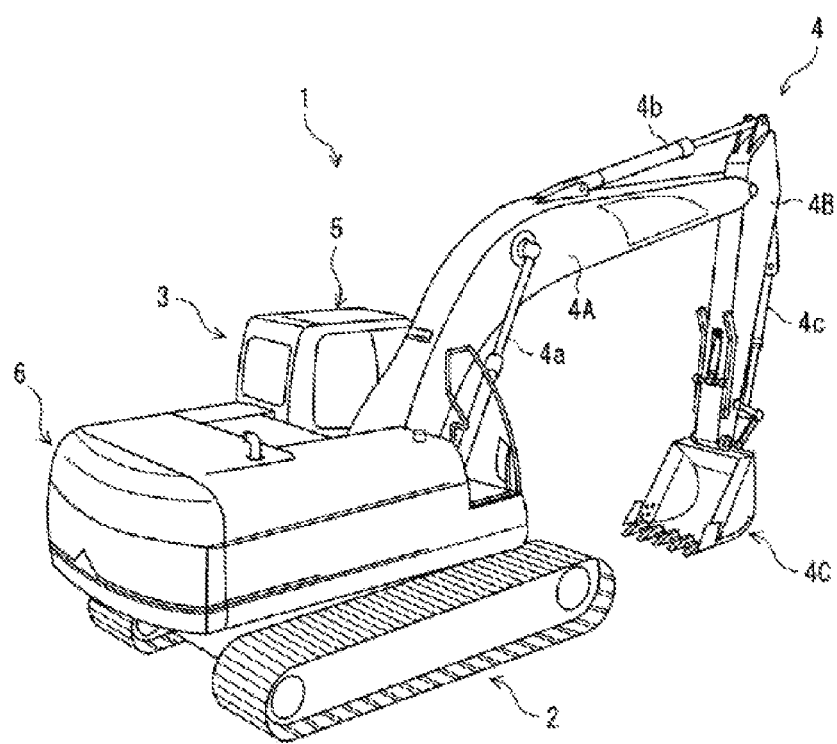
FIG. 1 is a schematic perspective view representing the overall constitution of a working machine according to an embodiment of this invention.

Reference is now made to FIG. 1 to illustrate the constitution of a hydraulic excavator according to an embodiment of the invention.

This hydraulic excavator 1 includes a lower traveling body 2 equipped with a crawler type travel device and an upper swiveling body 3 swivelably mounted on the lower traveling body 2. In the front side of a vehicle for the upper swiveling body 3, a cabin 5 for an operator (manipulator) to get in and a front work device 4 (hereinafter, referred to as work device) next to the cabin 5 are provided. Also, a counter weight 6 is disposed in the rearmost end of the upper swiveling body 3 so as to keep the weight balance of a body.

The work device 4 includes a boom 4A, a stick 4B, and a bucket 4C. A base end of the boom 4A is supported pivotally with respect to the upper swiveling body 3. Also, a boom cylinder 4a is placed between the boom 4A and the upper swiveling body 3, so that the boom 4A oscillates in accordance with expansion and contraction operations of the boom cylinder 4a.

Correspondingly, a base end of the stick 4B is supported pivotally with respect to the head end of the boom 4A and the bucket 4C is journalled to the head end of the stick 4B. A stick cylinder 4b is placed between the boom 4A and the stick 4B and a bucket cylinder 4c is placed between the stick 4B and the bucket 4C. The stick 4B and the bucket 4C oscillate respectively in accordance with expansion and contraction operations of the stick cylinder 4b and the bucket cylinder 4c.

Various types of operation levers and pedals (not shown) are provided in the inside of the cabin 5 in order to respectively input operation amount for these various hydraulic devices.

Here, a running motor (not shown) of hydraulic type (not shown) is provided in the lower traveling body 2 and a part of a hydraulic circuit including a hydraulic pump (not shown), a tank, or others is provided in the upper swiveling body 3. Between the lower traveling body 2 and the upper swiveling body 3, a swivel joint described later is provided in a swiveling center of the upper swiveling body 3; through this swivel joint, hydraulic oil is distributed between the hydraulic circuit in the upper swiveling body 3 and the running motor in the lower traveling body 2.

[2. Constitution of Swivel Joint]

Figure 3B:
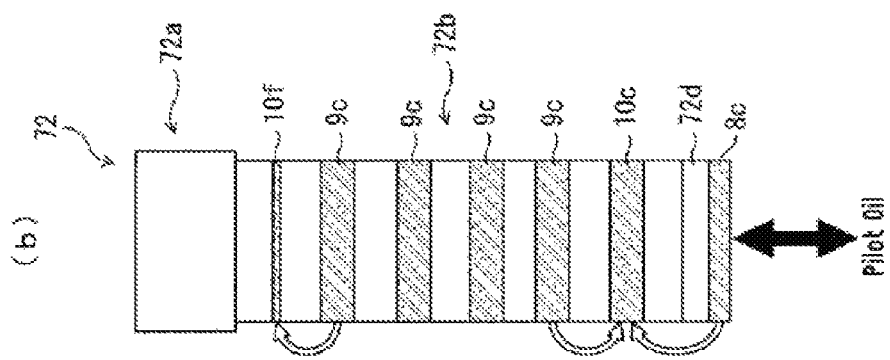
FIG. 3(a) is a longitudinal section view and FIG. 3(b) is a front view representing an inner body, an annular oil passage, a drain groove, and an oil chamber.
Figure 3A:
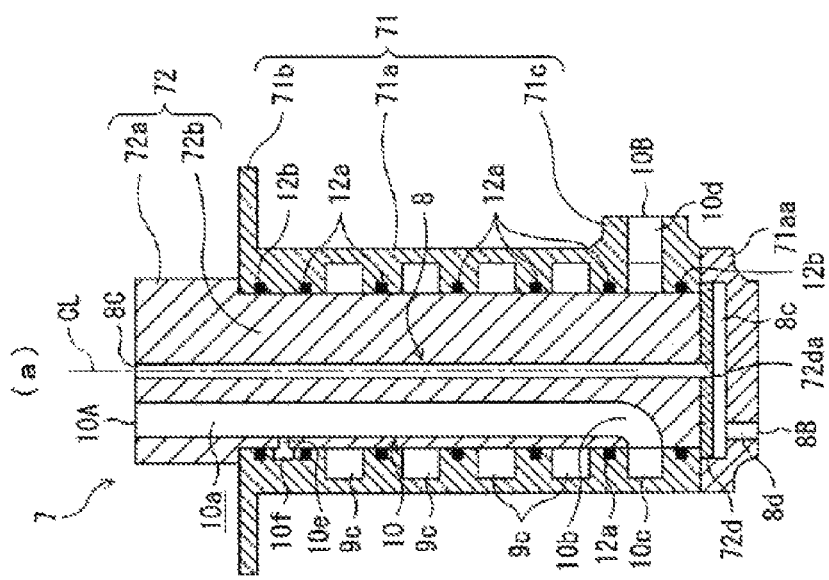
Figure 4:
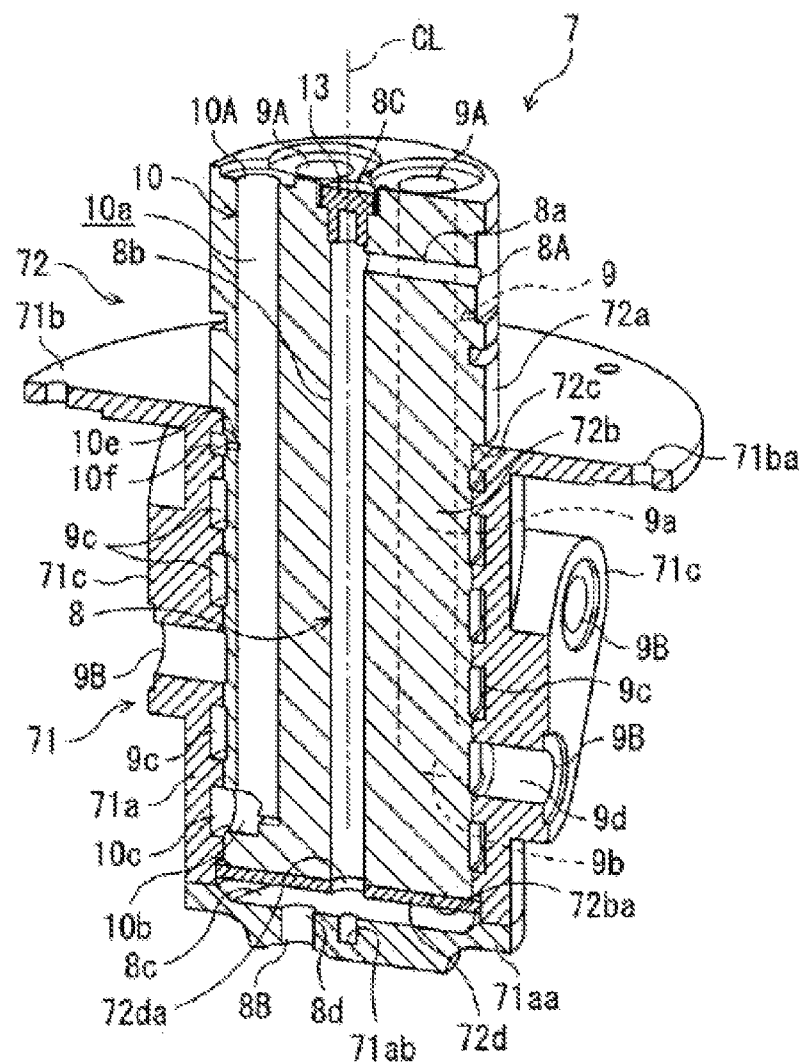
FIG. 4 is a view showing a schematic longitudinal section representing a constitution of the swivel joint for the working machine as the embodiment of the invention (however, the seal ring is omitted); the drawing shows a state in which the swivel joint is equipped with a plug instead of the rotation angle sensor and the rod.

Reference is now made to FIG. 2 through FIG. 4 to further illustrate the constitution of the swivel joint according to an embodiment of the invention.

As shown in FIG. 2 and FIG. 3, a swivel joint 7 includes an outer body 71 of roughly cylindrical shape to be installed in the lower traveling body 2 (see FIG. 1) and an inner body 72 of roughly cylindrical shape to be installed in the upper swiveling body 3 (see FIG. 1). The inner body 72 is relatively rotatably fitted in the outer body 71. A rotational center line CL of this relative rotation is in accordance with a swiveling center of the upper swiveling body 3.

Hereinafter, when the term "axial direction" is simply used, it represents an axial line direction (in other words, direction along the rotational center line CL) of the outer body 71 or the inner body 72; when the term "radial direction" is simply used, it represents a direction vertical to the rotational center line CL.

The outer body 71 includes a body portion 71a of cylindrical shape with a bottom (hereinafter, also referred to as outer body portion), a flange portion 71b provided in a top outer peripheral edge of the outer body portion 71a, and boss portions 71c, 71c protrusively provided oppositely to each other in outer peripheral surface of the outer body portion 71a.

The flange portion 71b is of an annular plate shape extending in the radial direction; and holes 71ba penetrating in a thickness direction are arranged at intervals in its outer peripheral edge. Bolts are respectively inserted into these holes 71ba, so that these bolts secure the outer body 71 on the lower traveling body 2. Note that a shape of the flange portion 71b is not limited to the annular plate shape; for example, the flange may be of square shape.

The boss portion 71c is of curved shape obliquely extending with respect to axial direction as seen in a side view. A lateral side of each boss portion 71c is supposed to be flat; and connection ports 9B, 10B for connecting to external pipes are provided on the lateral side.

The inner body 72 includes an upper part 72a (hereinafter, also referred to as upper inner body) that has larger outer diameter than an inner diameter of the outer body 71 and a lower part 72b (hereinafter, also referred to as lower inner body) that has slightly smaller outer diameter than the inner diameter of the outer body 71. The inner body 72 is placed on a top surface of the flange portion 71b of the outer body 71 at a shoulder part 72c between the upper part 72a and the lower part 72b; and a bottom surface 72ba (one end) of the lower part 72b is positioned above an inner wall surface (blocking surface) of a bottom wall 71aa of the outer body portion 71a. That is, a space 8c (oil chamber) is formed between the bottom surface 72ba of the inner body 72 and the bottom wall 71aa of the outer body 71.

A port 8C for mounting a sensor is arranged on the rotational center line CL on a top surface of the inner body 72; ports 9A, 10A for connecting to external pipes are provided in a circumference centered on the rotational center line CL.

Also, one pilot oil passage 8, four high-pressure oil passages 9, and one drain oil passage 10 are provided over the outer body 71 and the inner body 72 in the swivel joint 7.

The pilot oil passage 8 is an oil passage to distribute pilot oil with relatively low pressure as hydraulic oil and is forming a part of an oil passage (that is, a 1st/2nd speed changeover line (hereinafter, referred to as pilot line) to supply pilot pressure to a 1st/2nd speed changeover valve (hereinafter, simply referred to as changeover valve)) 21 that couples a pilot pump (not shown) installed in the upper swiveling body 3 and the changeover valve 21 for changing a speed of a running motor installed in the lower traveling body 2 to 1st or 2nd speed.

The pilot oil passage 8 includes a radial-directional oil passage 8a, an axial-directional oil passage 8b, an oil chamber 8c, and an oil hole 8d.

The radial-directional oil passage 8a is formed along radial direction in the inner body 72; and one end of it is opened in outer peripheral surface of the upper inner body 72a as a connection port 8A; and the other end thereof is communicated with the radial-directional oil passage 8b.

The axial-directional oil passage 8b is provided penetrating in axial direction in the inner body 72 and is arranged on the rotational center line CL. A rotation angle sensor 11a mentioned later is liquid-tightly inserted into the axial-directional oil passage 8b from the port 8C opened at a top of the inner body 72. In other words, the axial-directional oil passage 8b is used as a space for installing the rotation angle sensor 11a. Since a top of the axial-directional oil passage 8b is plugged by the rotation angle sensor 11a, the radial-directional oil passage 8a is provided so that this radial-directional oil passage 8a is connected to the axial-directional oil passage 8b at lower part of the rotation angle sensor 11a.

The oil chamber 8c includes upper and lower interstices (space) formed between the inner body 72 and the outer body 71. The upper part of the oil chamber 8c is communicated with a bottom (opening opened in a bottom surface 72ba of the inner body 72) of the axial-directional oil passage 8b.

The oil hole 8d is provided penetrating in axial direction in the bottom wall 71aa of the outer body 71 defining lower part of the oil chamber 8c at a position apart from the rotational center line CL and is open on a bottom surface of the bottom wall 71aa as a connection port 8B.

Note that, a plate 72d, on which an opening 72da that matches with an opening of the axial-directional oil passage 8b is provided, is superposedly provided on the bottom surface 72ba of the inner body 72. This plate 72d is intended to prevent the inner body 72 from coming off from the outer body 71 along axial direction (here, upwardly).

In other words, if the plate 72d is not provided, an oil pressure from the oil chamber 8c may act on the whole bottom surface 72ba of the inner body 72 to push up the inner body 72 upward and draw out the inner body 72 from the outer body 71; therefore the plate 72 is provided to prevent this. So, from now on, the plate 72d is referred to as a come-off prevention plate 72d.

The high-pressure oil passage 9 constitutes a part of a high-pressure line to supply hydraulic oil (hereinafter, referred to as high-pressure oil), whose pressure is higher than the pilot oil, to a pair of running motors 23 (see FIG. 2. However, only one of running motors is shown).

The high-pressure oil passage 9 includes an axial-directional oil passage 9a, a radial-directional oil passage 9b, an annular oil passage (first high-pressure oil passage) 9c, and radial-directional oil passage 9d. The axial-directional oil passage 9a and the radial-directional oil passage 9b are formed in the inner body 72 and constitute second high-pressure oil passage according to the invention.

The axial-directional oil passage 9a is bored along the axial direction in the inner body 72 at a position apart from the rotational center line CL; the top thereof is open on an upper surface of the inner body 72 as a connection port 9A; and the bottom thereof is connected to one end of radial-directional oil passage 9b.

The radial-directional oil passage 9b is bored along radial direction in the lower inner body 72b; the one end thereof is connected to a bottom of axial-directional oil passage 9a as mentioned earlier; and the other end thereof is connected to the annular oil passage 9c.

In inner peripheral surface of the outer body 71, an annular groove is open, whose height is same as the radial-directional oil passage 9b, and which is centered on the rotational center line CL; and the annular oil passage 9c is an annular oil passage formed between this annular groove and outer peripheral surface of the inner body 72.

The radial-directional oil passage 9d is formed along radial direction by penetrating the boss portion 71c of the outer body 71; one end of the radial-directional oil passage 9d is connected to a periphery of annular oil passage 9c; and the other end thereof is open on a lateral side of the boss portion 71c as the connection port 9B.

In addition, the radial-directional oil passage 9b, the annular oil passage 9c, and the radial-directional oil passage 9d constitute a plurality of the high-pressure oil passages 9 and are arranged by displacing their positions in axial direction.

The drain oil passage 10 is an oil passage to distribute drain oil (oil leaked from a high-pressure oil passage present in an inside of the running motor 23), whose pressure is further lower than high-pressure oil and pilot oil, and forms a part of oil passages for putting the drain oil back to a tank 22 installed in the upper swiveling body 3. Also, the drain oil passage 10 has a function to recover high-pressure oil leaked and pilot oil leaked.

The drain oil passage 10 includes an axial-directional oil passage 10a, radial-directional oil passages 10b, 10d, and 10e, an annular oil passage (first high-pressure oil passage) 10c, and an annular oil passage (oil recovery passage, hereinafter, also referred to as drain groove) 10f. The axial-directional oil passage 10a and the radial-directional oil passage 10b are formed in the inner body 72 and constitute a second drain oil passage according to the invention.

The axial-directional oil passage 10a is bored along the radial direction in such a way in the inner body 72 at a position apart from the rotational center line CL that it is formed deeper than any other plurality of high-pressure oil passages 9. The top of the axial-directional oil passage 10a is open on the upper surface of the inner body 72 as a connection port 10A and the bottom thereof is connected to one end of the radial-directional oil passage 10b.

The radial-directional oil passage 10b is bored along the radial direction in the lower inner body 72b at a lower position than any other plurality of high-pressure oil passages 9; one end of the radial-directional oil passage 10b is connected to a bottom of the axial-directional oil passage 10a as mentioned earlier; and the other end thereof is connected to the annular oil passage 10c.

In the inner peripheral surface of the outer body 71, an annular groove is open, whose height is same as the radial-directional oil passage 10b, and which is centered on the rotational center line CL; and the annular oil passage 10c is an oil passage formed between this annular groove and the outer peripheral surface of the inner body 72.

There are two radial-directional oil passages 10d and these passages are formed penetrating respectively along the radial direction in both boss portions 71c of the outer body 71. An one end of each radial-directional oil passage 10d is connected to a periphery of the annular oil passage 10c and the other end thereof is open on outer peripheral surface of the boss portion 71c as the connection port 10B.

The radial-directional oil passage 10e is bored along the radial direction in the lower inner body 72b at a higher position than any other high-pressure oil passages 9; one end of the radial-directional oil passage 10e is connected to an intermediate part of the axial-directional oil passage 10a; and the other end thereof is connected to the drain groove 10f.

In the inner peripheral surface of the outer body 71, an annular groove is open, whose height is same as the radial-directional oil passage 10e, and which is centered on the rotational center line CL; and the drain groove 10f is an annular oil passage formed between this annular groove and outer peripheral surface of the inner body 72.

While the axial-directional oil passage 10a, the radial-directional oil passage 10b, the annular oil passage 10c, and the radial-directional oil passage 10d are mainly for a purpose of distributing drain oil, the radial-directional oil passage 10e and the drain groove 10f are provided as backups for releasing (recovering) high-pressure oil (hereinafter, also referred to as leaked oil) leaked from the high-pressure oil passage 9 to the drain oil passage 10.

That is, as mentioned later, a seal ring 12a (see FIG. 3(a)) is arranged around the annular oil passage 9c constituting a part of the high-pressure oil passage 9; if this seal ring 12a should be damaged and high-pressure oil goes over the seal ring 12a, the radial-directional oil passage 10e and the drain groove 10f are provided so that the high-pressure oil (leaked oil) can be recovered.

Since a flow rate of the leaked oil is smaller compared to a flow rate of drain oil, a cross-sectional area of the oil passages 10e, 10f, which are intended for oil recovery, is configured to be smaller than a cross-sectional area of oil passages 10a to 10d, which are intended for drain oil distribution.

Thus, the drain groove 10f is arranged on top of a plurality of annular oil passages 9c for high-pressure oil and the annular oil passage 10c for drain oil is arranged on bottom of the plurality of annular oil passages 9c for high-pressure oil, so that the plurality of annular oil passages 9c for high-pressure oil are held vertically by the low-pressure annular oil passage 10c and the drain groove 10f, even if any part of the seal ring should be damaged, the leaked oil can be recovered with the drain oil passage 10 so that the leaked oil can be restricted from leaking out of the swivel joint 7.

In sliding contact surface between the outer body 71 and inner body 72, as shown with hollow arrows in FIG. 3(b), the leaked oil leaks vertically out of the annular oil passage 9c, so the leaked oil leaked downward escapes into the annular oil passage 10c for low-pressure drain oil and the leaked high-pressure oil leaked upward escapes into the low-pressure drain groove 10f. Moreover, the pilot oil leaked out of the oil chamber 8c escapes into the annular oil passage 10c for low-pressure drain oil. So, the leaked high-pressure oil and the leaked pilot oil can be escaped into the drain oil passage 10 and the leaked high-pressure oil and the leaked pilot oil as well as the drain oil can be recovered into the tank 22.

Figures 2A, 2B:
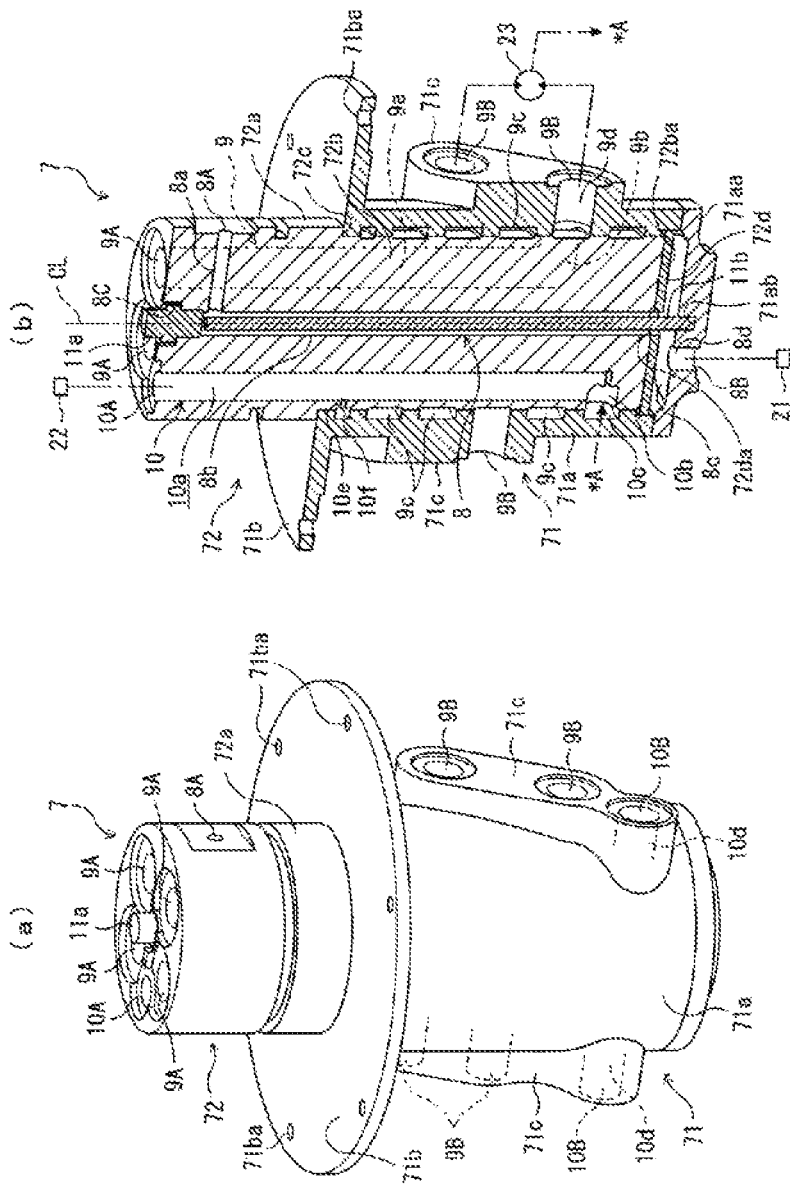
FIG. 2(a) is a perspective view and FIG. 2(b) is a view representing the longitudinal section of FIG. 2(a) (however, a seal ring is omitted) along with an oil system.

As mentioned above, in order to avoid the high-pressure oil, the pilot oil, and the drain oil from being leaked in the sliding contact surface between the outer body 71 and the inner body 72, as shown in FIG. 3(a) although omitted in FIG. 2(b), the seal ring (seal member) 12a or a seal ring (seal member) 12b is attached respectively on the sliding contact surface between the outer body 71 and the inner body 72 in between two oil passages of annular oil passages 9c, 10c, and 10f and outward in the axial direction (downward of annular oil passage 10c and upward of leak groove 10f in FIG. 3(a)) in the annular oil passages 9c, 10c, and 10f.

To mention in detail, the high-pressure seal ring 12a is attached between two oil passages of annular oil passages 9c for high-pressure oil and outward in the axial direction in the annular oil passages 9c; and the low-pressure seal ring 12b is attached outward in the axial direction (downward in FIG. 3(a)) of the annular oil passage 10c for the drain oil and outward (upward in FIG. 3(a)) in the axial direction in the drain groove 10f.

Even if a rotational position of the inner body 72 is at any position relative to the outer body 71, this constitution keeps a communicative condition of the radial-directional oil passages 9b, 10b, and 10e formed in the inner body 72 and the annular oil passages 9c, 10b, 10f formed in the outer body 71. Thus, even when the inner body 72 rotates along with the upper swiveling body 3 by any angle relative to the outer body 71, high-pressure oil, pilot oil, and drain oil can be distributed between the lower traveling body 2 and the upper swiveling body 3 so that the leaked oil can be recovered into the drain oil passage 10.

Also, as one of the main characteristics of the present invention, a rod 11b is inserted into the axial-directional oil passage 8b of the pilot oil passage 8 in order to detect a swivel angle of the upper swiveling body 3. The bottom of the rod 11b is press-fitted into a hole portion 71ab provided on an inner wall surface (blocking surface) of the bottom wall 71aa in the outer body 71. A sufficient clearance is ensured to transmit pilot pressure between a wall defining the axial-directional oil passage 8b and the rod 11b.

The top of the rod 11d is opposed with a clearance to the rotation angle sensor 11a installed in the inner body 72, as mentioned above. The rotation angle sensor 11a is a non-contact sensor and can detect angle of the rod 11b without coming into contact with the rod 11b. An angle of the rod 11b secured via the outer body 71 on the lower traveling body 2 and an angle of the rotation angle sensor 11a secured via inner body 72 on the upper swiveling body 3 may also change according to a swivel angle against the lower traveling body 2. Thus, the rotation angle sensor 11a can detect the swivel angle of the upper swiveling body 2 by detecting the angle of the rod 11b.

As the rotation angle sensor 11a, various well known noncontact sensors such as magnetic angle sensor can be used.

Also, when a construction machine is of a model which may not need to detect a swivel angle of the upper swiveling body 3, as shown in FIG. 4, remove the rod 11b and then install a plug 13 in the port 8C in place of the rotation angle sensor 11a.

In other words, even if the rotation angle sensor 11a and the rod 11b are not present, the swing angle of the upper swiveling body 3 can be detected by removing the plug 13 and installing the rod 11b and the rotation angle sensor 11a afterward.

[3. Action and Effect]

According to the swivel joint for the working machine as one embodiment of the invention, the rod 11b to detect angle of the upper swiveling body 3 is inserted into the pilot oil passage 8.

It may be possible to insert the rod 11b into the drain oil passage 10 by providing the drain oil passage 10 on the rotational center line CL in place of the pilot oil passage 8; but in this case, it should be necessary to increase a diameter of the drain oil passage 10 as much as a cross-section area of the rod 11b so that necessary amount of oil can flow.

Since a pilot line including the pilot oil passage 8 is intended to transmit a signal from an operation lever (not shown) via pressure (pilot pressure) to an operation device (here, changeover valve 21), it is important that the pilot line is filled with pilot oil as a pressure transmitting medium; when inserting the rod 11b into the pilot oil passage 8, an impact on an oil distribution may be relatively small compared to when inserting the rod 11b into any other oil passage such as the drain oil passage 10.

Thus, by inserting the rod 11b into the pilot oil passage 8, the embodiment of the invention enables to keep almost the same diameter as the pilot oil passage 8 before and after of the insertion of the rod 11b; in addition, since it is not necessary to provide an extra space for installing the rod 11b, the swivel angle can be detected while restricting an increase in the size of the swivel joint.

Furthermore, it is concerned that, by inserting the rod 11b into the drain oil passage 10, a drain pressure may rise to cause oil to leak externally (hereinafter, referred to as external leak) out of the running motor 23 or cause damages to a shaft seal in an inside of the running motor 23; since the rod 11b is inserted into the pilot oil passage 8 in the swivel joint according to the embodiment, there is no concern (external leak from the running motor 23 and damage of the shaft seal in the inside of the running motor 23) mentioned above. Now, we will give reasons for it.

When the rod 11b is arranged in the drain oil passage 10, a presence of the rod 11b increases a distribution resistance of the drain oil passage 10. Since the drain oil is to return to the tank 22, when the drain oil receives a resistance from a mechanism (here, rod 11b) provided within a passage (drain oil passage), the pressure of the drain oil may rise. Since the pressure of the drain oil is low in general, the shaft seal is designed by supposing that the pressure of the drain oil is low. Thus, when the pressure of the drain oil rises, the internal mechanism of the running motor 23 may be broken, so that a durability performance of the shaft seal may be exceeded. On the other hand, by arranging the rod 11b in the pilot oil passage 8, although the presence of the rod 11b may increase the distribution resistance of the pilot oil passage 8, the pilot oil pressure only slightly drops and the seal in the inside of the running motor 23 could not be damaged. When the diameter (diameter of a passage constituting the pilot line) of the pilot line may be configured larger, the pressure can be transmitted to the running motor installed in the lower traveling body 2 without degrading switching responsiveness of the changeover valve 21, to which the pilot oil pressure is supplied.

Since the rotation angle sensor 11a that detects the angle of the rod 11b does not come into contact with the rod 11b, a failure or degradation of detection accuracy can be suppressed due to an interference of the rotation angle sensor 11a and the rod 11b arising from vibration, which is generated by the operation of a construction machine 1, and a deflection or an eccentricity of the rod 11b.

Since the pilot oil passage 8 penetrates through the inner body 72 to form the connection port 8C on an outer surface, the rotation angle sensor 11a can be installed on this connection port 8C if it is necessary to detect a swivel angle. Also, the rod 11b can be installed on the bottom wall 71aa of the outer body 71 through the pilot oil passage 8. Thus, it is possible to easily install the rotation angle sensor 11a and the rod 11b afterward without decomposing the swivel joint 7.

In particular, according to this embodiment, since the connection port 8C is provided on an upper surface of the inner body 72, it is easy to access the connection port 8C while the swivel joint 7 remains mounted onto a vehicle of the construction machine 1; it is not required to remove the swivel joint 7 from the vehicle of the construction machine 1 when installing the rotation angle sensor 11a or the rod 11b.

Furthermore, the axial length of the swivel joint 7 can be shortened compared to before and a manufacturing of the swivel joint 7 can be simplified.

Figure 5B:
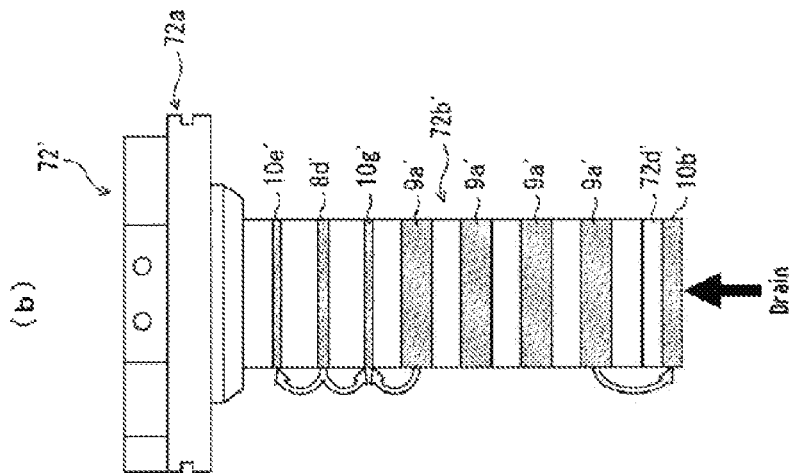
FIG. 5(a) is a longitudinal section view and FIG. 5(b) is a front view representing an inner body, an annular oil passage, a drain groove, and an oil chamber.
Figure 5A:
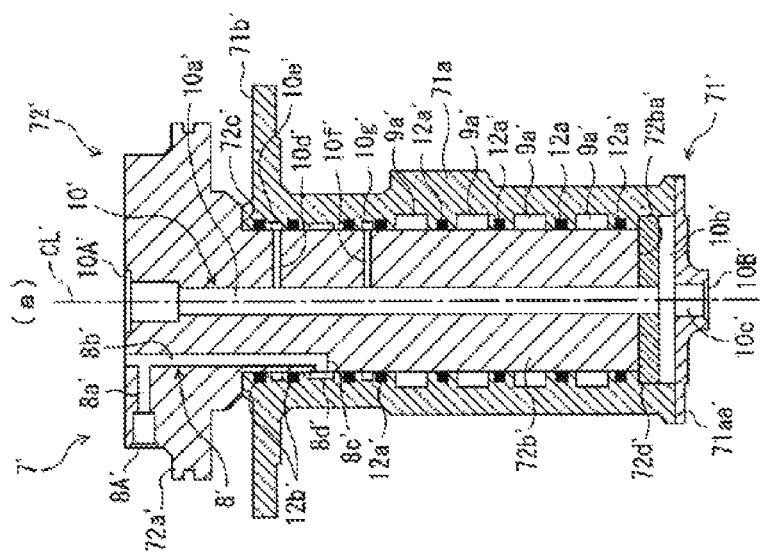

Here, we describe the constitution of a conventional swivel joint by referring to FIGS. 5(a), 5(b).

As shown in FIGS. 5(a) and 5(b), a conventional swivel joint 7' includes an outer body 71' to be installed in the lower traveling body and an inner body 72' to be installed in the upper swiveling body; and the inner body 72' is fitted relatively rotatably into the outer body 71'.

The outer body 71' includes a body portion 71a' of cylindrical shape with a bottom and a flange portion 71b' provided in a top outer periphery of the body portion 71a'.

The inner body 72' includes an upper part 72a' (hereinafter, also referred to as upper inner body), which has a larger outer diameter than the inner diameter of the outer body 71', and a lower part 72b' (hereinafter, also referred to as lower inner body), which has a slightly smaller outer diameter than the inner diameter of the outer body 71'. In the inner body 72', a shoulder part 72c' between the upper part 72a' and the lower part 72b' is placed on an upper surface of the outer body 71; the a bottom surface 72ba' of the lower part 72b' is positioned above the inner wall surface of a bottom wall 71aa' of the outer body portion 71a'. That is, a space 10b' (oil chamber) is formed between the bottom surface 72ba' and the bottom wall 71aa'.

A port 10A' for connecting to an external oil pipe is arranged on a rotational center line CL' on a top surface of the upper inner body 72a; a port 8A' for connecting to an external pipe is provided on a side surface of the upper inner body 72a'.

Also, one pilot oil passage 8', four high-pressure oil passages 9', and one drain oil passage 10' are provided over the outer body 71' and the inner body 72' in the swivel joint 7'.

The pilot oil passage 8' includes a radial-directional oil passage 8a', an axial-directional oil passage 8b', a radial-directional oil passage 8c', and an annular oil passage 8d'.

One end of the radial-directional oil passage 8a' is opened in outer peripheral surface of the upper inner body 72a' as a connection port 8A; and the other end of it is connected to the radial-directional oil passage 8b'.

The axial-directional oil passage 8b' is bored in the axial direction over upper inner body 72a' and upper part of the lower inner body 72b; and the bottom thereof is connected to the radial-directional oil passage 8c'. Note that the top of the axial-directional oil passage 8b' is sealed with a plug (not shown).

The annular oil passage 8d' is formed between a groove formed in the inner peripheral surface of the outer body 71' and outer peripheral surface of the inner body 72', and is an annular oil passage centered on the rotational center line CL' of the swivel joint 7'.

Moreover, a radial-directional oil passage (not shown) is provided in the outer body 71' penetrating in a thickness direction of a peripheral wall. One end of this radial-directional oil passage is connected to an outer peripheral side of the annular oil passage 8d; and the other end thereof is open on outer peripheral surface of the outer body 71' as a connection port.

The high-pressure oil passages 9' constitute a part of high-pressure line supplying high-pressure oil to the running motor.

Each high-pressure oil passage 9' includes an oil passage (not shown) formed in the inner body 72', an annular oil passage 9a' formed in the outer body 71', and a radial-directional oil passage (not shown).

Each annular oil passage 9a' is formed between the groove formed in the inner peripheral surface of the outer body 71' and the outer peripheral surface of the inner body 72', and is the annular oil passage centered on the rotational center line CL' of the swivel joint 7'. Each annular oil passage 9a' is arranged in lower position than the annular oil passage 8d' for pilot oil.

One end of oil passage (not shown) formed in the inner body 72' is connected to an inner peripheral side of the annular oil passage 9a'. The other end of this oil passage (not shown) is opened in an outer surface of the upper inner body 72a' and constitutes a connection port. Also, one end of radial-directional oil passage (not shown) formed in the outer body 71' is connected to an outer peripheral side of the annular oil passage 9a'. The other end of this radial-directional oil passage (not shown) is opened in the outer peripheral surface of the outer body 71' and constitutes a connection port.

The drain oil passage 10' includes an axial-directional oil passage 10a', an oil chamber 10b', an oil hole 10c', a radial-directional oil passages 10d', 10f', and annular oil passages (hereinafter, referred to as drain groove) 10e', 10g'.

The axial-directional oil passage 10a' is provided penetrating in the axial direction on the rotational center line CL' in the inner body 72' and is open on the upper surface of the inner body 72' as a connection port 10A'.

The oil chamber 10b' includes space formed between the inner body 72' and the outer body 71'. The upper part of the oil chamber 10b' is communicated with the bottom of the axial-directional oil passage 10a'.

The oil hole 10c' is provided penetrating in the axial direction in a bottom wall 71aa' of the outer body 71' defining lower part of the oil chamber 10b' and is open on the bottom surface of the bottom wall 71aa' as a connection port 10B'.

Note that, in the bottom surface of an inner body 72', a come-off prevention plate 72d' is superposed, which has an opening that matches with an opening of the axial-directional oil passage 10a'. The come-off prevention plate 72d' is to prevent the inner body 72' from coming off upward with pressure of the oil chamber 10b'.

Radial-directional oil passages 10d', 10f' are formed respectively in the inner body 72; and the one ends thereof are connected to the axial-directional oil passage 10a' and the other ends thereof are respectively connected to the drain grooves 10e', 10g' opened in inner periphery of the outer body 71'.

In the inner peripheral surface of the outer body 71', drain grooves 10d', 10g' are annular oil passages respectively formed between annular groove centered on a rotational center line CL' in the inner peripheral surface of the outer body 71' and the outer peripheral surface of the inner body 72'.

The drain groove 10d' is arranged above the annular oil passage 8d' for pilot oil and the drain groove 10g' is arranged under the annular oil passage 8d' for pilot oil. That is, the drain grooves 10d', 10g' are arranged so that the drain grooves 10d', 10g' hold the annular oil passage 8d' for pilot oil vertically.

In sliding contact surface of the outer body 71' and the inner body 72', as shown with hollow arrows in FIG. 5(b), the conventional swivel joint 7' recovers high-pressure oil leaked downward from the annular oil passage 9a' into the oil chamber 10b' for drain oil, high-pressure oil leaked upward from the annular oil passage 9a' and pilot oil leaked downward from the annular oil passage 8d' into the drain groove 10g', and pilot oil leaked upward from the annular oil passage 8d' into the drain groove 10e'. The drain groove 10g' enables to prevent high-pressure oil leaked upward from the annular oil passage 9a' from escaping into annular oil passage 8d' for pilot oil lest a pilot oil pressure or amount is changed.

In sliding contact surface of the outer body 71' and the inner body 72', a seal ring 12a' for high-pressure oil or a seal ring 12b' for low-pressure oil is attached between two oil passages of annular oil passages 9a', 10g', and 10e' and outward in axial direction in the annular oil passages 9a', 10g', and 10e'.

On the other hand, in the swivel joint 7 according to the embodiment, as shown in FIG. 2 and FIGS. 3(a), 3(b), the pilot oil passage 8 is formed along the radial direction in the inner body 72; but any annular oil passage for pilot oil is not formed in sliding contact surface of the outer body 71 and inner body 72. Therefore, compared to a conventional swivel joint 7', there is no need to hold annular oil passage for pilot oil with two drain grooves; only one drain groove 10f is needed. Thus, the total number of annular oil passages including drain grooves can be reduced.

As the total number of annular oil passages is reduced, the total number of seal rings can be reduced, which are provided between annular oil passages and outward in the axial direction in the annular oil passages.

Furthermore, as annular oil passages provided in the axial direction and seal rings are reduced, the axial length of the swivel joint 7 as well as the inner body 72 can be shortened compared to the conventional swivel joint 7'; and a manufacturing of the swivel joint 7 can be simplified.

[4. Others]

(1) In the embodiment above, the rotation angle sensor 11a is of noncontact type, but it can be of contact type as well.

(2) In the embodiment above, annular oil passage 9c, 10c, and 10f are formed between annular groove opened in inner peripheral surface of the outer body 71 and outer peripheral surface of the inner body; but, the annular oil passage 9c, 10c, and 10f may be formed between the inner peripheral surface of the outer body 71 and an annular groove opened in the outer peripheral surface of the inner body or between an annular groove opened in the inner peripheral surface of the outer body 71 and the outer peripheral surface of the inner body.

(3) In the embodiment above, the outer body 71 is installed in the lower traveling body 2 and the inner body 72 is installed in the upper swiveling body 3; but, a configuration is possible where the outer body 71 is installed in the upper traveling body 3 and the inner body 72 is installed in the lower swiveling body 2, that is, where the constitution shown in FIGS. 2(a), 2(b) is turned upside down.

(4) In the embodiment above, the rod 11b is secured on the outer body 71 and the rotation angle sensor 11a is secured on the inner body 72; but, the rotation angle sensor 11a may be secured on the outer body 71 and the rod 11b may be secured on the inner body 72.

(5) In the embodiment above, a first high-pressure oil passage and a second drain oil passage are configured respectively to be a combination of the axial-directional oil passage and the radial-directional oil passage; but, a configuration of annular oil passage formed in the outer body 71 is not limited to the profile above. For example, the annular oil passage can be configured by combining oil passages inclined to the axial or radial direction.

Correspondingly, although the oil passage 8a, which is connected to the connection port 8A on the outer peripheral surface from the axial-directional oil passage 8b for pilot oil, is described as radial-directional, the oil passage 8a may be inclined against radial-direction.

In the embodiment above, the connection ports for high-pressure oil and drain oil are provided on the top surface of the inner body 72 (oil passages for high-pressure oil and drain oil are open in the top surface of the inner body 72); but, the connection ports for high-pressure oil and drain oil may be provided in a side surface of the inner body 72 (oil passages for high-pressure oil and drain oil may be opened in the side surface of the inner body 72).

In short, as long as each oil passage formed in the inner body 72 is connected to a connection port opened in the outer surface of the inner body 72 and an annular oil passage formed between the outer body 71 and the inner body 72, each oil passage is not limited to a particular profile.

EXPLANATION OF REFERENCE NUMERALS

2 Lower traveling body
3 Upper swiveling body
7 Swivel joint
8 Pilot oil passage
8A, 8B Connection ports for the pilot oil passage 8
8C Port for mounting a sensor provided in the pilot oil passage 8
8a Radial-directional oil passage constituting the pilot oil passage 8
8b Axial-directional oil passage constituting the pilot oil passage 8
8c Oil chamber (space) constituting the pilot oil passage 8
8d Oil hole constituting the pilot oil passage 8
9A, 9B Connection ports for the high-pressure oil passage 9
9 High-pressure oil passage
9a Axial-directional oil passage constituting the high-pressure oil passage 9

9*b* Radial-directional oil passage constituting the high-pressure oil passage 9
9*c* Annular oil passage constituting the high-pressure oil passage 9 (first high-pressure oil passage)
9*d* Radial-directional oil passage constituting the high-pressure oil passage 9
10A Drain oil passage
10A, 10B Connection ports for the drain oil passage 10
10*a* Axial-directional oil passage constituting the drain oil passage 10 (second drain oil passage)
10*b* Radial-directional oil passage constituting the drain oil passage 10 (second drain oil passage)
10*e*, 10*d* Radial-directional oil passage constituting the drain oil passage 10
10*c* Annular oil passage constituting the drain oil passage 10 (first drain oil passage)
10*f* Annular oil passage constituting the drain oil passage 10 (drain groove, oil recovery passage)
11*a* Rotation angle sensor
11*b* Rod
12*a* Seal ring (seal member) for high-pressure
12*b* Seal ring (seal member) for low-pressure
13 Plug
21 Changeover valve
22 Tank
23 Running motor
71 Outer body
71*a* Body portion of the outer body 71
71*aa* Bottom wall of the body portion 71*a*
71*ab* Hole portion provided in the bottom wall 71*aa*
72 Inner body
72*a* Upper part of the inner body 72
72*b* Lower part of the inner body 72
72*ba* Bottom surface of the lower part 72*b* (one end of inner body 72)
CL Rotational center line for upper swiveling body 3 and swivel joint 7

The invention claimed is:

1. A swivel joint for a working machine for distributing hydraulic oil between a lower traveling body and an upper swiveling body swivelably installed on the lower traveling body, the swivel joint for the working machine comprising:
an outer body being secured on one of the lower traveling body and the upper swiveling body and having a blocking surface on one end thereof;
an inner body being secured on the other of the lower traveling body and the upper swiveling body, the inner body being relatively and rotatably fitted in the outer body, while opposing to the blocking surface in a spaced manner at one end thereof;
a pilot oil passage being formed on a rotational center line of the inner body for distributing pilot oil;
a rod having a first end and an opposite second end, the rod being inserted into the pilot oil passage and being secured at the first end on one of the outer body and the inner body; and
a rotation angle sensor for detecting a rotation angle of the rod, the rotation angle sensor being secured on the other of the outer body and the inner body, the rotation angle sensor being positioned at least partially in the pilot oil passage proximate the second end of the rod, a space being defined between the rotation angle sensor and the second end of the rod.

2. The swivel joint of claim 1, characterized in that the pilot oil passage is open at one end of the inner body; the rod is secured on the blocking surface of the outer body at one end thereof and arranged within the pilot oil passage at the other end thereof so as to be inserted from the one end of the inner body; and the rotation angle sensor is installed on the inner body while opposing to the other end of the rod.

3. The swivel joint of claim 2, characterized in that the rotation angle sensor is a noncontact sensor arranged at an interval at the other end of the rod.

4. The swivel joint of claim 2, characterized in that the pilot oil passage is provided penetrating from the one end to the other end of the inner body; and the rotation angle sensor is installed on the other end of the inner body so as to be inserted into the pilot oil passage.

5. The swivel joint of claim 1, characterized in that the lower traveling body includes:
a plurality of first annular high-pressure oil passages, which are equipped with a running motor that works with high-pressure oil higher than the pilot oil, which are formed between the inner peripheral surface of the outer body and the outer peripheral surface of the inner body, and in which the high-pressure oil to be supplied to the running motor flows; a first annular drain oil passage, which is formed between the inner peripheral surface of the outer body and the outer peripheral surface of the inner body, and in which an oil leaked from the running motor flows;
an annular oil recovery passage, which is formed between the inner peripheral surface of the outer body and the outer peripheral surface of the inner body, and which is configured to recover high-pressure oil leaked from the first high-pressure oil passages; a plurality of second high-pressure oil passages, which are formed in the inner body, and which are communicated respectively with a plurality of the first high-pressure oil passages; and
a second drain oil passage, which is formed the inner body, and which is communicated with the first drain oil passage and the oil recovery passage, wherein the first drain oil passage and the oil recovery passage are arranged so as to hold a plurality of the first high-pressure oil passages from outside in the axial direction of the outer body and the inner body.

6. The swivel joint of claim 5, characterized in that, between the inner peripheral surface of the outer body and the outer peripheral surface of the inner body, seal members are installed at both sides in the axial direction outside between the plurality of first high-pressure oil passages, the first drain oil passage, and the oil recovery passage.

\* \* \* \* \*